(12) United States Patent  
Amjadi

(10) Patent No.: US 7,933,895 B2
(45) Date of Patent: Apr. 26, 2011

(54) COUPON AND INTERNET SEARCH METHOD AND SYSTEM WITH MAPPING ENGINE

(75) Inventor: Kamran Amjadi, Bethesda, MD (US)

(73) Assignee: Catalina Marketing Corporation, St. Petersburg, FL (US)

(*) Notice: Subject to any disclaimer, the term of this patent is extended or adjusted under 35 U.S.C. 154(b) by 193 days.

(21) Appl. No.: 11/653,308

(22) Filed: Jan. 16, 2007

(65) Prior Publication Data

US 2007/0174259 A1    Jul. 26, 2007

Related U.S. Application Data

(60) Provisional application No. 60/758,538, filed on Jan. 13, 2006.

(51) Int. Cl.
*G06F 17/30* (2006.01)
(52) U.S. Cl. ................. 707/722; 707/999.203; 705/14.1
(58) Field of Classification Search ........................ None
See application file for complete search history.

(56) References Cited

U.S. PATENT DOCUMENTS

| | | |
|---|---|---|
| 3,632,995 A | 1/1972 | Wilson |
| 4,554,446 A | 11/1985 | Murphy et al. ............... 235/487 |
| 4,674,041 A | 6/1987 | Lemon et al. ................. 364/401 |
| 5,004,270 A | 4/1991 | Broderick et al. ........... 283/48.1 |
| 5,176,224 A | 1/1993 | Spector ........................... 186/52 |
| 5,185,695 A | 2/1993 | Pruchnicki .................... 364/401 |
| 5,214,793 A | 5/1993 | Conway et al. .............. 455/49.1 |
| 5,249,044 A | 9/1993 | Von Kohorn .................... 358/86 |
| 5,285,278 A | 2/1994 | Holman ......................... 358/142 |
| 5,287,181 A | 2/1994 | Holman ......................... 348/473 |
| 5,308,120 A | 5/1994 | Thompson ....................... 283/70 |
| 5,501,491 A | 3/1996 | Thompson ....................... 283/70 |
| 5,627,549 A | 5/1997 | Park ............................. 342/357 |
| 5,684,859 A | 11/1997 | Chanroo et al. ................ 379/58 |
| 5,822,735 A | 10/1998 | De Lapa et al. ................. 705/14 |
| 5,844,221 A | 12/1998 | Madigan, Jr. et al. ......... 235/383 |
| 5,845,259 A | 12/1998 | West et al. ...................... 705/14 |
| 5,852,775 A | 12/1998 | Hidary .......................... 455/404 |
| 5,865,470 A | 2/1999 | Thompson ....................... 283/70 |
| 5,969,678 A | 10/1999 | Stewart ......................... 342/457 |
| 6,014,090 A | 1/2000 | Rosen et al. ................... 340/905 |
| 6,041,308 A | 3/2000 | Walker et al. ................... 705/14 |
| 6,571,279 B1 | 5/2003 | Herz et al. ..................... 709/217 |
| 7,376,591 B2 * | 5/2008 | Owens ............................ 705/26 |
| 7,734,621 B2 * | 6/2010 | Weitzman et al. ............ 707/720 |
| 2001/0051901 A1 | 12/2001 | Hager et al. ..................... 705/26 |
| 2002/0087384 A1 | 7/2002 | Neifeld ........................... 705/10 |
| 2002/0194069 A1 | 12/2002 | Thakur et al. ................... 705/14 |
| 2003/0004802 A1 | 1/2003 | Callegari ........................ 705/14 |
| 2003/0088461 A1 | 5/2003 | Christensen ..................... 705/14 |
| 2004/0056101 A1 | 3/2004 | Barkan et al. ............ 235/472.03 |

(Continued)

*Primary Examiner* — Debbie Le
(74) *Attorney, Agent, or Firm* — Neifeld IP Law, PC

(57) ABSTRACT

The invention relates to coupon information (e.g., actual coupons, links to coupon, and information related to one or more coupons) that may be selectively displayed based on an association with search terms for an internet-based search. If a user, for instance, submits a search request to an internet-based search engine, the search engine may process the request and provide the search results, but, in addition, a coupon engine may perform a separate search to determine the availability of coupons relating to the search (e.g., based on one or more search terms, one or more of the search results, or other criteria). Available coupons (or coupon information) may then be displayed with, or separately from, the general internet search results.

36 Claims, 6 Drawing Sheets

U.S. PATENT DOCUMENTS

| | | | |
|---|---|---|---|
| 2005/0075932 A1 | 4/2005 | Mankoff | 705/14 |
| 2005/0216336 A1* | 9/2005 | Roberts et al. | 705/14 |
| 2007/0073580 A1* | 3/2007 | Perry et al. | 705/14 |
| 2007/0118426 A1 | 5/2007 | Barnes, Jr. | 705/14 |
| 2007/0192183 A1* | 8/2007 | Monaco et al. | 705/14 |
| 2007/0203791 A1* | 8/2007 | Kohl et al. | 705/14 |
| 2007/0204025 A1* | 8/2007 | Cox et al. | 709/223 |

* cited by examiner

COUPON AND INTERNET SEARCH METHOD AND SYSTEM WITH MAPPING ENGINE

CROSS-REFERENCE TO RELATED APPLICATIONS

This application claims the benefit of U.S. Provisional Application entitled "Coupon and Internet Search Method and System with Mapping Engine", Ser. No. 60/758,538, filed Jan. 13, 2006.

FIELD OF THE INVENTION

The invention relates to a system and method that integrates a coupon engine with one or more of a search engine (e.g., an internet search engine), a keyword-based advertising module, a local search feature of a search engine, and/or an internet-based map/directions engine.

BACKGROUND OF THE INVENTION

Electronic coupon distribution systems, in general, are known. Various drawbacks and limitations exist with respect to existing coupon distribution systems.

SUMMARY OF THE INVENTION

One aspect of the invention relates to providing an electronic coupon distribution system and method that overcomes various problems and shortcomings of known systems, and/or provides enhanced features and capabilities.

One aspect of the invention relates to a system and method for displaying coupon information including, but not limited to, the manufacturer, retailer(s), availability, and/or value, where the displayed coupon information may be selected (for display) based on an association with internet search results, and/or with keyword-based ads generated by a keyword-based advertising module of a search engine. According to one aspect of the invention, the system may integrate a coupon engine with one or more of a search engine, a keyword-based advertising module of a search engine, a local search feature of a search engine, and/or an internet-based map/directions engine. In an alternative embodiment, the coupon engine may be separately implemented to operate in association with one or more of a search engine, a keyword-based advertising module of a search engine, a local search feature of a search engine, and/or an internet-based map/directions engine.

As used herein, any references to the display of coupons or coupon information may broadly include the display of an image of a coupon, and/or the display of any information about one or more coupons (e.g., a manufacturer, retailer(s), indication of availability, a product for which the coupon is available, the value of the coupon, expiration date, etc.). The displayed coupon information, may relate to coupons that are generally available, coupons that are targeted based on one or more user-specific targeting criteria, coupons associated with a user-requested search and/or other coupons.

In one example, coupon information (e.g., actual coupons, links to coupon, and information related to one or more coupons) may be selectively displayed based on an association with search terms for an internet-based search. If a user, for instance, submits a search request to an internet-based search engine, the search engine may process the request and provide the search results, but, in addition, a coupon engine may perform a separate search to determine the availability of coupons relating to the search (e.g., based on one or more search terms, one or more of the search results, or other criteria). Available coupons (or coupon information) may then be displayed with, or separately from, the general internet search results. Alternatively, a coupon database may be supplied to the search engine such that the search engine may include the coupon database when compiling search results. In this implementation the coupon database may be supplied, owned, and/or associated with a third party (e.g., coupon provider, coupon distributor, etc.)

If the search engine includes a keyword-based advertising module, the coupon engine may be operable together with the keyword-based advertising module to enable coupon information to be selected and/or displayed based on an association with keyword-based ads and/or products relating to the keyword-based ads.

According to another aspect of the invention, the local search feature of a search engine may be operable together with coupon engine to enable coupon information to be associated with results from a local search performed using a local search feature of an internet search engine.

According to one aspect of the invention, the system may display coupon information associated with one or more map locations relating to fixed or mobile location information associated with a user. User location information may be conveyed via any number of known modes of communication. For example, fixed and/or mobile location data may be provided manually by a user (e.g., by directly inputting an address or other geographic location information), or in an automated manner (e.g., conveyed to the search system through a wireless device with global positioning capability or a plug-in device on a CPU). A user's current location may be displayed on a map by an identifier (e.g., any combination of one or more letters, numbers, symbols, as well as any type of graphics including, but not limited to, a cartoon character, photo of the user, etc.).

According to another aspect of the invention, a map/directions engine and coupon engine may be operable together to enable coupon information to be associated with map locations (e.g., locations corresponding to retail stores at which a coupon can be redeemed, locations at which a product or service relating to a coupon is available, or other locations and/or directions to one or more such locations).

According to another aspect of the invention, the local search feature, coupon engine, and map/directions engine may be operable together to enable coupon information to be associated with results from a local search, and/or to enable coupon information to be associated with map locations, and/or to provide directions to one or more locations.

According to another aspect of the invention, the coupon engine, keyword-based ad module, and local search feature may be operable together to enable coupon information to be associated with results from keyword-based ads, and/or to enable coupon information to be associated with results from a local search, and/or to enable such coupon information to be associated with map locations, and/or to provide directions to one or more locations.

According to another aspect of the invention, coupon engine, keyword-based ad module, and map/directions engine may be operable together to enable coupon information to be associated with results from keyword-based ads, and/or to enable coupon information to be associated with map locations, and/or to provide directions to one or more locations.

In any of the configurations contemplated herein, coupon information maybe selected according to one or more of the techniques described herein (e.g., based on an internet-based search, keyword-based ads, a local search, or otherwise) and displayed with (or separately from) the internet-based search results. For example, the coupon information may be displayed in a side panel next to the search results, above the search results, below the search results, or otherwise.

In some or all aspects of the invention, the coupon information may be targeted coupon information. The targeting of coupon information may be based on user-related criteria including user-related location criteria, and/or any other targeting criteria. By way of example only, targeting criteria may include one or more of a user's preferences, a user's demographic data, a user's observed behavior, a user's declared behavior, and/or any other common profile data (e.g., age, sex, marital status, etc.).

Targeting may also be based on search terms and/or search results. Keyword search results may be directly or indirectly associated with coupon information. Coupon information determined to relate to search results may be displayed separately from (or in conjunction with) the search results. As is known and understood by those having skill in the art, targeting of a user may include targeting based on information relating to an individual user, or to a group of users (e.g., the user's household).

In some aspects of the invention, one or more coupons may be targeted based on at least a user-related location criteria. The user-related location criteria may include fixed location data, and/or mobile location data.

Fixed location data, for example, may include one or more relatively fixed locations associated with a user (e.g., a work address, a home address, etc).

Mobile location data may include a current location of a mobile user (e.g., as detected by GPS, as entered by a user, or as ascertained in any number of known manners), anticipated location information (e.g., a city or other locale to which a user is traveling), and/or other mobile location data. Anticipated location information may be determined in a variety of ways including, for example, being based on location-based search terms associated with a search request. One advantage of the invention is the ability to target coupon information using location criteria (and at least one other targeting criteria, if desired).

According to one aspect of the invention, a user may request a search (e.g., by entering one or more search terms and/or other search criteria). The search criteria may relate to one or more of a product or service, a retailer, a location, or other information. The system may perform the search using the user-specified search criteria, and present the search results to the user (e.g., by displaying or otherwise presenting the search results). The search results may be displayed to a user in a search results screen. The search results themselves may include web sites, URL links, and/or other web resources relevant to the specified search criteria. According to one aspect of the invention, the system may also associate coupon information for one or more coupons with the search results, and display the coupon information to the user. The user may then make a selection which is received by the system. The user selection may include selection of one or more items from the search results, coupon information associated with the search results, an advertisement, web link, and/or other items. The selection may be to receive more details related to an item, a request to take action based on the selection, a request to make use of the selected information (e.g., buy a product using the coupon) and/or other selections.

Coupon information may display coupons directly or indirectly link to one or more coupons. Indirect coupon information may include coupon information for an indication of the availability of a coupon, link to manufacturer's website, link to retailer website and/or other indirect way of displaying a coupon image. Direct coupon information may present one or more coupon images to a user without having to link to other websites. The form of the display may include a main search results window, one or more ad windows, keyword ad-based windows, coupon windows, and/or other displays.

According to one aspect of the invention, coupon information associated with search results may be displayed on, or in conjunction with, a map. The display may include directions, distance, and other information pertaining to coupon-related locations (e.g., one or more locations at which a user can redeem a coupon). By clicking on (or otherwise highlighting or selecting) a map location, the system may display directions and/or other information associated with the selected location. Other map features may include location identifiers such as stars, numbers, letters, or other symbols or graphics that correspond to a coupon-related location.

In one implementation, upon selection of a location or a location identifier by a user, the system may display detailed street-by-street directions in a directions window.

In another implementation, information related to a coupon location may be displayed in an expandable window (or other display) which may include tabs (or other selection mechanisms) that correspond to various categories of information.

When viewing a map, a user may control one or more display characteristics such as zoom, pan, re-center, and tilt. In some implementations, a user may also set a radius of display in feet, yards, street blocks, miles, or other designated measures of distance.

According to one aspect of the invention, the system may comprise a remote and/or centrally-located search computer or computers (or computer system) that may comprise a search engine, a local search feature associated with the search engine, a map/directions engine, a coupon engine, and/or a keyword-based advertisement engine, among other system components. The search system computer may provide coupon information by: receiving search criteria; transmitting search results with coupon information; receiving a user selection relating to the search results, transmitting information relating to a user selection; and/or enabling user to make use of the information. The search system computer may enable retrieval of coupons by remote users directly or indirectly (e.g., by communicating with a coupon tool).

One advantage of the invention relates to the provision of coupon information on a map (or other geographic display) in order to display coupon-related locations.

Another advantage of the invention relates to the electronic distribution of coupons having real-time, consumer-based directions.

Yet another advantage of the invention relates to the electronic distribution of coupons for products or services, where associated retail/point-of-sale facilities within a defined area may be displayed on a map (or other display) along with a coupon information.

Still yet another advantage of the invention relates to enabling a user to select an option to print coupons, directions and/or a map-view (when the user downloads a coupon or coupon information) including direction to and from determined location, such as the user's current location, home address, work address, redemption location, facilities address, and/or other address or location.

These and other objects, features, and advantages of the invention will be apparent through the detailed description of the preferred embodiments and the drawings attached hereto. It is also to be understood that both the foregoing general

DETAILED DESCRIPTION OF PREFERRED EMBODIMENTS

A system and method is disclosed for integrating a coupon engine with one or more of a search engine (e.g., an internet search engine), a keyword-based advertising module, a local search feature of a search engine, and/or an internet-based map/directions engine.

Figure 1:
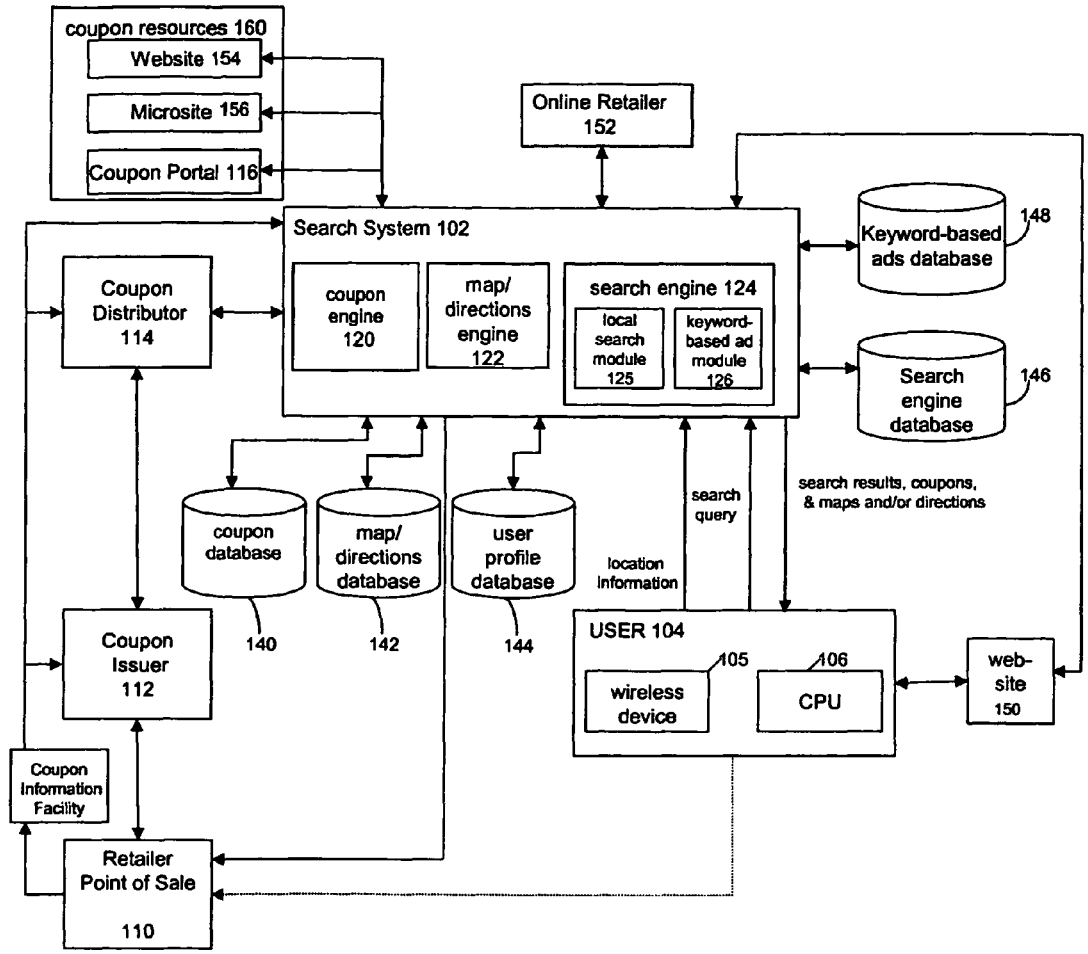
FIG. 1 is an exemplary depiction of a schematic of an electronic coupon distribution system.

FIG. 1 illustrates an example of a search system 102, according to one aspect of the invention. Search system 102 may comprise one or more of a coupon engine 120, a map/directions engine 122, a search engine 124, or other components.

Search engine 124 may further comprise one or more of a local search module 125, a keyword-based ad module 126, or other components. As used herein, search engine 124 may comprise any commercially (or other) known search engine such as, for example, the types of search engines provided by Google™, Yahoo!™, Amazon.com, Answers.com, Alta Vista™, Ask Jeeves™, and/or others. The details of these and other search engines are generally known and, therefore, will not be described herein.

Search system 102 may also include (or be in operative communication with) one or more databases, including, for example, a coupon database 140, a map/directions database 142, a user profile database 144, a keyword-based ads database 148, and/or one or more search engine databases 146.

It should be appreciated that the information in databases 140, 142, 144, 146 and 148 may be maintained in one or more databases, or on each of a plurality of databases using distributed database technology. Moreover, any of the databases described herein may comprise, include, or interface to, for example, an Oracle™ relational database sold commercially by Oracle Corporation. Other databases, such as Informix™, DB2 (Database 2) or other data storage or query formats, platforms, or resources such as OLAP (On Line Analytical Processing), SQL (Standard Query Language), a SAN (storage area network), Microsoft Access™ or others may also be used, incorporated, or accessed into the invention.

As depicted in FIG. 1, search system 102 may be in operative communication with one or more user devices 104, one or more retailers 110, one or more online retailers 152, one or more other websites 154, 150, coupon information resources 160, and/or one or more coupon information distributors 114.

Search system 102, along with one or more of the system components described herein, may comprise one or more computers or computer systems. In one implementation, search system may comprise one or more servers which may be or include, for instance, a workstation running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep™, or other operating system or platform.

A user device 104 may include any one or more of, for instance, a personal computer, portable computer, PDA (personal digital assistant), workstation, web-enabled mobile phone, WAP device, web-to-voice device, or other device. In one implementation, one or more users may access the features and functionality of search system 102 through an interface (e.g., a web browser).

Entities (or system components) illustrated in FIG. 1 may be accessed by other entities (or system components) over one or more networks. Although many of the examples set forth herein refer to the Internet, it should be understood that a network may include any one or more of, for instance, an intranet, a PAN (Personal Area Network), a LAN (Local Area Network), a WAN (Wide Area Network), a SAN (Storage Area Network), a MAN (Metropolitan Area Network), or other network.

Communication between entities (or system components) may occur via any suitable communications link including, but not limited to, a copper telephone line, a Digital Subscriber Line (DSL) connection, a Digital Data Service (DDS) connection, an Ethernet connection, an Integrated Services Digital Network (ISDN) line, an analog modem connection, a cable modem connection, a wireless connection, or other communications links.

One or more of the system components described herein may include various software modules to accomplish the functionalities described herein. As would be appreciated, the functionalities described herein may be implemented in various combinations of hardware and/or firmware, in addition to, or instead of, software. Those having skill in the art will appreciate that the invention described herein may work with various system configurations. Accordingly, more or less of the aforementioned system components may be used and/or combined in various implementations.

The system and method disclosed herein may further, in various implementations, incorporate some or all of the features and functionality set forth in U.S. Pat. Nos. 6,321,208, 6,493,110, 5,710,886, 6,035,280, each of which is incorporated herein by reference in its entirety.

Executing a Search

According to one implementation of the invention, coupon information (e.g., actual coupons, links to coupons, and information related to one or more coupons) may be selectively displayed to a user based on an association with search terms for an Internet search.

For example, a user may access search engine 124 and enter search criteria. Search engine 124 may process the search request and provide the search results, but, in addition, coupon engine 120 may perform a separate search against coupon database 140 and/or any other database to determine the availability of coupons relating to the search (e.g., based on one or more search terms, one or more of the search results, or other criteria). Accordingly, search results displayed to the user may also include coupon information associated with one or more of the search results and/or search criteria, among other things.

Before, during, and/or after search engine 124 processes the search results, coupon engine 120 may process and transmit related coupon information and/or map information to the user. Coupon information may be based, among other things, on one or any combination of the following: stored user preferences; information from a search query (e.g., search terms); a user's location, a user's observed online behavior, search results (including local search results, keyword advertisements), other user-entered information, and/or other information.

Search system 102 may process the information stored within coupon information database 140, map database 142, user profile database 144, keyword ads database 148, search engine database 146, and other databases. One or more of the listed databases (or other databases) may be provided for use with the search system 102 by a third party content provider.

User Profile Database 144 may include, for example, user profile information, a record of a user's observed online behavior, user preferences (e.g., categories of interest, preferred locations, preferred devices, etc.), demographic information (e.g., age, sex, marital status, etc.), frequency of visits to particular facilities, and other information. Categories of interest may include restaurants, groceries, products, services, clothing, pets, hobbies, sports, and any number of other interests.

Details in User Profile Database 144 may include a user's preferences and selections with respect to a particular category. For example, under a "restaurants" category, the user may provide details regarding the type of cuisine preferred by the user, how often the user dines out, the user's preferred restaurants, and other related information. In one implementation, user profile information may be used for coupon targeting, as will be described in detail below.

Coupon database 140 may include coupons, information related to coupons, information relating to products or services, advertisements, promotions, incentives, and/or other information. The coupon database 140 may be supplied by a third party to the search system 102.

Coupon information may include an item description (e.g., including model and manufacturer), the amount of discount, the original retail price, issuer information, expiration date, issue date, restrictions (e.g., buy "x" no. of units, get "y" no. of units for free), redemption location/address, method of distribution, method of valid redemption, eligibility, availability, manufacturer, and/or other information.

Map Database 142 may include local and regional street maps, possible redemption locations (e.g., retail facilities), and other related information. In Map Database 142, general location information may be stored as a series of maps, or as one large map. This enables search system 102 to plot a user's location and determine one or more nearby facilities associated with coupon information (e.g., retail locations available for coupon redemption). A user's location (e.g., home address, work address, school address, etc.) may be manually input (by the user), or determined from other available information (e.g., the user's IP address, cookies, or other information associated with a user device). If a user is utilizing a wireless device 105, user location information may be communicated in real-time via GPS technology.

Map database 142 may also include the location of possible coupon redemption facilities, retail/point-of-sale facilities, or other specified locations that honor the displayed coupon information, or that promote coupon use. Location data may be in the form of a street address or a plot on a local map. Since different stores of the same chain often enforce different restrictions, accurate promotion/coupon information may be maintained in database 142 along with information regarding point-of-sale facility locations. This information also enables search system 102 to provide accurate detailed directions to the user and an actual map of the user's location with respect to the location.

The keyword based ads database 148 may include advertisements, commercials, logos, product information, sponsor information, links to other websites, and/or other advertisement related information. Advertisements may be added and deleted from the database as needed. Third party advertisement providers may be allowed access the database in order to add their advertising information to the database. Each advertisement may be pre-associated with a keyword and/or a keyword may be automatically assigned to the advertisement based on text and/or other information from the ad.

The coupon engine 120 may process coupon information received from coupon distributor 114 and store the coupon information (in coupon database 140). The coupon engine may perform a search to determine coupon information relating to a search (e.g., based on one or more search terms, one or more of the search results, or other criteria). Coupon engine 120 may also provide targeted coupon information to a particular user, such as User 104, or a class of users based on user's search criteria in combination with user profile information, user's location, and/or other information.

Local Search

Figure 2:
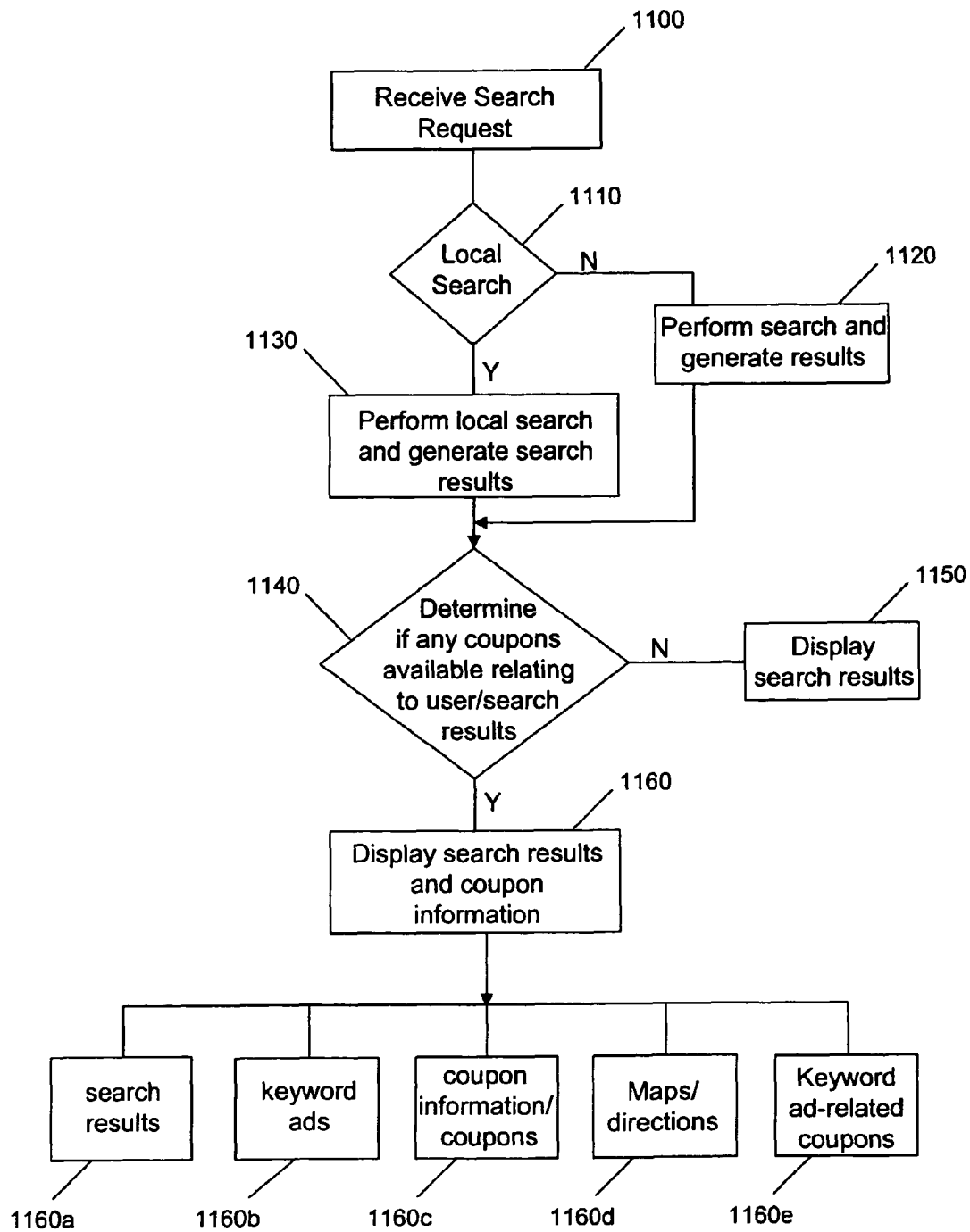
FIG. 2 depicts a flow chart of processing according to the invention, in one regard.

FIG. 2 depicts a flow chart of processing, according to one implementation of the invention, relating to performing searches for coupon information. The following operations may be accomplished using all or some of the of the system components described in detail herein, and may incorporate all of the features and functionality of the invention as set forth in the detailed description and accompanying drawing figures.

In one implementation, a search request may be received (operation 1100) and used to determine whether it is a local search (operation 1110). A local search request may be characterized to include one or more location search parameters, for example, zip code, address, city, state, county, area code, district, point of interest, or coordinates, and or other location information. Location search parameters may also be identified by a device's IP address, cookie information, and/or GPS signals. If the search request relates to a local search, a local search is performed and search results are generated (operation 1130). If the search request is not a local search, however, a general search is performed to generate search results (operation 1120).

In operation 1140, a determination is made whether there is coupon information available relating to a user's search query or search results. If coupon information related to the search query or search results do exist, the search results and coupon information may be displayed in an operation 1160.

Any combination of information may be displayed to a user. The information may comprise a search result 1160a, keyword ads 1160b, coupons or coupon-related information 1160c, maps/directions 1160d, and/or keyword ad-related coupons 1160e. If no coupons are determined to be available, and/or related to the search results, then the search results may be displayed without coupon information (e.g., operation 1150).

According to one aspect of the invention, coupon engine 120 may be used in combination with local search module 125 to present coupon information associated with local search results for a search query. For example, if a user enters the search term "hardware" with an indication of a geographical area (e.g., zip code), search engine 124 may display search results including local hardware stores. Coupon engine 120 may find, for example, coupons redeemable at one or more of the local hardware stores displayed in the search results so that coupon information can be displayed in association with the search results. Thus, a user who performs a search for information (other than a search specifically for coupons)

may automatically receive coupon information without having to perform a separate search for coupon information.

The local search feature of the invention enables users to conveniently search for information within a certain geographical area (e.g., a local search). A location search parameter may be manually entered by the user in order to define a local region of interest. The location search parameter may be a geographic location such as city, zip, and/or address where the user is located or willing to travel. In an effort to properly define the location, the user may specify at least the city and/or zip code information as a location search parameter so that search result may be properly limited. A local search result may be displayed in various manners including a results listing, a map display, and/or via delivery in message format selected by the user (e.g., e-mail, text message, etc.).

A local search based on one or more location terms in combination with search criteria may result in a ranked listing, map display, or a rank listing in association with a map display. The combination of search criteria with local search parameters enables users to set broad to narrow search parameters.

In one implementation, location search parameters may be indicated directly using a map that may be provided by map engine 122. A user may select to view a map of their city (or other location). The local search feature of search engine 124 enables a user to first indicate a location on a map, and then provide search criteria. Map engine 122 may indicate to search engine 124, the map parameter and area so as to enable search engine 124 to return search results associated with the mapped area. As such, a user's search results are directly associated with the mapped location.

In an alternative implementation, a location search parameter may be automatically determined based on a user's current location. As recited above, the user's current location may be determined by user profile, IP address, cookies, global positioning device and/or any other location determining means. Thus, the user's search query may be automatically associated with the user's current location.

For any given location search parameters, coupon engine 120 may identify coupon information (within coupon database 140) that may be redeemable at a redemption location corresponding to a location search parameter. Any combination of identified coupon map, and/or directional information may be displayed to a user in combination with search results. Therefore, coupons from coupon information database 140 that are redeemable within the identified map location may be displayed in association with the search results.

Maps

Map/directions engine 122 may be used to display coupon information and/or other search results in (or associated with) a map (e.g., street map, area map, satellite map, hybrid map, etc.). A user's search results may be displayed directly in a map. Coupon information related to the mapped search results may also be presented to a user, either in the map or associated with the map. Coupon information relating to the mapped location independent of the search results may also be presented for display to the user.

A user may choose to display a specified map location corresponding to a geographic location (e.g., zip code, city, street, neighborhood, etc.). Coupon information may be displayed on (or in association with) the map corresponding to the displayed geographic location. Coupon information may be associated with one or more geographic locations and may further be defined based on location of a redemption facility, retail store, warehouse facility, point-of-sale facility, entertainment venue, shopping malls, recreational point of interest, and/or transportation hub, among other locations.

Map/directions engine 122 may process map information and optionally receive location information using a GPS system. Map/directions engine 122 may process coupon location information for display on a map. Map engine 122 may also retrieve user location information via a user's GPS-enabled device, via manual input from a user, from previously stored user location information, or via other means. Directions to a coupon location (or other location) from a user's location may also be processed by map/directions engine 122. Directions may be adapted for a user depending on whether the user is walking, driving, using public transportation, etc.

As previously recited, coupon information may be displayed on (or in conjunction with) a map. The display may include directions, distances, and other information for coupon-related locations (e.g., one or more locations at which a user can redeem a coupon). By clicking on (or otherwise selecting) a map location, the system may display directions and/or other information. Other map features may include location identifiers such as stars, numbers, letters, or any other symbols or graphics that correspond to a coupon-related location.

By selecting a location or a location identifier, the system may display detailed street-by-street directions on a directions window. For example, a directions window may display the street name, the distance the user should travel on a particular street, and other directional information to assist a user in reaching a destination location. Other options are available. For example, by placing a pointer (such as a mouse) over a coupon location identifier, information related to that coupon location (e.g., a retail facility) may be displayed.

In one implementation, information related to a coupon redemption location may be displayed in an expandable window (or other display) which may include tabs (or other selection mechanisms) that correspond to various categories of information. For example, a user interface may include an address tab, a coupons tab, a ratings tab, and/or other tabs. Availability information and other coupon-related information associated with a particular coupon location may also be displayed. The ratings tab may include product or facility related consumer ratings information. Other information may also be included.

When viewing a map, a user may specify display characteristics such as zoom, pan, re-center, and tilt. In some implementations, a user may also set a radius of display in feet, yards, street blocks, miles, or other designated measures of distance.

According to one aspect of the invention, a user may choose to display a specified map location corresponding to a geographic location (e.g., zip code, city, street, neighborhood, etc.). Coupon information may be displayed on (or in association with) the map corresponding to the displayed geographic location. Coupon information may be associated with one or more geographic locations and may further be defined based on the location(s) of a redemption facility, retail store, warehouse facility, point-of-sale facility, entertainment venue, shopping mall, recreational point of interest, and/or transportation hub, among other locations.

A user may search for coupon information with respect to a particular geographic location, product, class of products, service, type of service, product or service provider, business and/or manufacturer, among others.

Keyword-Ads

One aspect of the invention relates to a system and method for displaying coupon information selected based on an association with Internet search results and/or with keyword-based ads generated by keyword-based advertising module 126 of search engine 124.

According to one implementation, search engine 124 may include (or be in operative communication) with a keyword-based ad module 126. Keyword-based ad module 126 may enable search results to include keyword-based advertisements that are presented to a user along with a list of search results. Keyword-based ads (e.g., Google's Ad Words), in general, are known. In one implementation, coupon engine 120 may be used in combination with keyword-based advertisement module 126 to present coupon information associated with keyword-based advertisements. The coupon engine 120 may be operable together with the keyword-based advertising module 126 to enable coupon information to be selected and/or displayed based on an association with keyword-based ads and/or products relating to the keyword-based ads. The coupon information provides added incentive and/or promotions to exiting keyword ad content, thus encouraging a user to redeem or use the coupon information toward the purchase of a product and/or service.

Graphical User Interface

Figure 3:
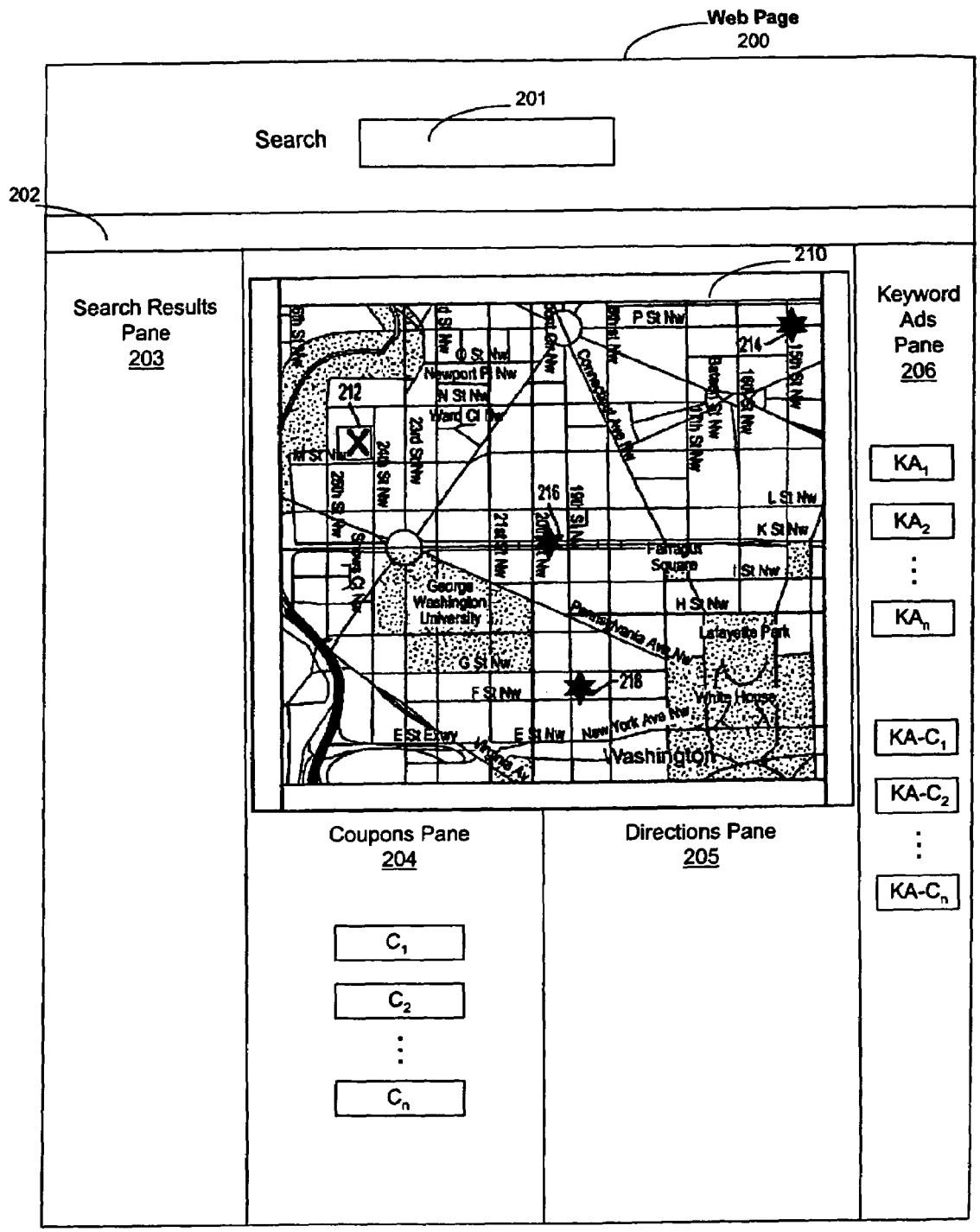
FIG. 3 is an exemplary depiction of a display that may be presented to a user.

FIG. 3 is an exemplary depiction of a display that may be presented to a user. It should be understood that the displays described in detail herein, and illustrated in the accompanying drawing figures, are exemplary only and may differ in appearance, content, and configuration in various implementations. Further, and as may be described herein, the terms "button," "pull-down, menu," "tab," "click-box," "checkbox," "hypertext link," and "hot link," are each particular examples of a generic "selection portion" which may comprise any known navigational tool that enables users to select, access, display, or navigate through the various views, portions, or modules of the invention. The selection portions may be accessed using any known input device such as, for example, a keyboard, computer mouse, light stylus instrument, or finger or other body part in a touch-screen implementation.

While a selection portion may be described and illustrated as a tab in one implementation, it could comprise a different selection portion (e.g., a check-box) in an alternative implementation. These selection portions may be present in addition to the various navigational tools that may be unique to, or associated with, a web browser (e.g., Netscape™) or other Graphical User interface (GUI).

According to one implementation, FIG. 3 illustrates an example of a web page 200 used to display search entry box 201, information bar 202, search results pane 203, associated coupons pane 204, directions pane 205, keyword ads pane 206, and map pane 210. Web page 200 provides the user with coupon information in coupon pane 204.

Web page 200 may provide a map pane 210 to display a map corresponding to location search parameter(s). Optionally, a user may choose to navigate the map to determine a location search parameter.

In one implementation, search terms for a search query may be entered in, for example, search entry box 201. One or more search results may be displayed within a search panel 203, and associated with one or more identifying location markers 214, 216, and 218, on the map. Identifying markers may identify coupon redemption locations, a user's current location (e.g., such as marker 212), or other locations of relevance.

Coupons pane 204 may display coupon information (e.g., $C_1$, $C_2$, $C_3$) to a user. Directions Pane 205 may display detailed directions to a selected identifying marker or other location on the map. Keyword ads pane may be displayed in association with the search query to display links, sponsors, advertisements (e.g., $KA_1$, $KA_2$, $KA_n$) and/or other information for keyword based coupon information (e.g., $KA\text{-}C_1$, $KA\text{-}C_2$, $KA\text{-}C_n$).

Search results, search term entry boxes, the map, directions, and keyword ads may be displayed in other areas of web page 200 and are not limited to their respective panes. For example, information bar 202 may be utilized as a scrolling or static bar to display various types of additional information including, but not limited to, real-time traffic alerts, directions, coupon information, sponsor ads, consumer alerts, additional links of interest, and/or other information.

In one implementation, location parameter may be the name and/or location of a shopping mall. In this implementation, a map of the shopping mall may be displayed in the map pane 210 with coupon information shown on or in association with the map pane 210. Shopping malls may include any number and variety of stores in a single location. Thus, a conventional street map may fail to specify the location of coupon redemption within a shopping mall. A user, while planning a trip to a large shopping mall, may take advantage of coupons of interest while at the mall. Thus, a user at a large shopping mall or shopping center may choose to conduct a search for coupon information within a shopping mall so that they may receive the exact location of an offered coupon within the shopping mall facility. The search may also be conducted in real-time via the user's mobile device while the user is in the mall. The invention is not limited by the type of map used to display coupon information. Other maps such as satellite imagery, traffic, climate, economic, political, topographic, population, and/or other maps are within the scope of the present invention.

In one implementation, a user may specify a shopping mall or other type of facility where many vendors or services may reside as a location search parameter in search entry box 201. A map of the facility (e.g., a shopping mall directory) may be shown in detail to enable a user to search for services and items in supply and available for purchase. Coupon information associated with the location (e.g., the shopping mall) may also be displayed within the coupons pane 204.

For each user, a search history may be recorded and stored at search system 102 (e.g., user profile database or other location) so that the user may refresh a previously entered search at a later time or create a search agent. A user may also have the option of book-marking searches as search agents for "favorite" searches. The search agent may get refreshed on a regular basis. The user may also identify a notification mechanism (e.g., email, phone number, instant message, mailer, etc.) to be used to alert the user of updates associated with created search agents. For example, a user may input his or her daily commute information (e.g., routes traveled from work to home—or vice versa) and may request to view coupon information for restaurants that appear along the route(s). This search agent may be refreshed periodically to notify the user (e.g., via email, text message, phone call, etc.) of updated coupon information for restaurants, new restaurants, or to determine whether others are still in business.

If a user travels on foot or by bike, the user may request a search or create a search agent having a search radius specified by a number of street blocks, or in some other form of distance measurement. For example, a user who works and lives in New York City may wish to search for businesses that are within a few blocks from the user's location. Optionally, a virtual street level map may also be displayed. This may enable a user to view actual street level images as if the user where actually walking down the street. Images may include digital pictures, or other images rendered to represent the actual street views. Coupon information may be displayed on the images.

According to another example, a user may specify a local region, such as a neighborhood, city, town, and/or zip code. Other areas and limitations may also be identified for which the user may wish to search within. Displayed coupon information for coupons that may be redeemed may be displayed within the specified area.

In one implementation, a user may view detailed street by street directions to locations that may be presented in search results pane 203. A user may select a coupon from the map and receive directions to that coupon location based on the user's current location 212. A user's location (e.g., home address, work address, school address, etc.) may be manually entered (e.g., input by the user) or determined automatically from, for example, a user IP address, cookies, or other information associated with user device 104. If a mobile device is being utilized, the user location information may be communicated in real-time via GPS.

In one implementation, a user may receive driving, walking, and/or public transportation directions from their location to the selected coupon location. Accordingly, FIG. 3 also illustrates an example of directional information associated with a user's search. A user may view map 210 which may display locations associated with search queries. Locations may include places of business, points of attraction, parks, schools, government locations, and/or other locations. Locations associated with the search, along with coupons, and/or ads may be identified by star symbols, number symbols, or other identifiers that correspond to a ranked search result.

By selecting a map location identifier (e.g., 214, 216, 218) from the map pane 210, a user may view detailed street-by-street directions on directions pane 205. For example, directions pane 205 may display the street name, the distance the user should travel on a particular street, and other directional information to assist a user in reaching a destination. Other options are available. For example, by placing a pointer (such as a mouse) over a map location identifier 214, 216, 218, information related to that location (e.g., retail facility) may be displayed. In one implementation, information related to the location identifier may include coupons, ratings/reviews, street addresses, telephone numbers, images, or other information may be displayed in an expandable window.

The information associated with the location identifier may be organized into various tabs, for example, address tab, coupons tab, ratings tab, image tab and/or other tabs may be displayed. Address tab may include information such as a street address, facility name and phone number. Availability information and other product or service related information associated with a particular business location may also be displayed to the user under a stock tab. Ratings tab may include product or business related consumer ratings. Other information may also be included.

In viewing the map, the user may specify display characteristics such as zoom, pan, re-center, and tilt. The user may also set a radius of display in yards, street blocks, miles, among others. The user may also convey their current location to the search system 102. User location information may be conveyed to the search system 102 through a wireless device 105 with global positioning capability or a plug-in device on a CPU 106. Location information may also be conveyed manually by the user or through other modes of communication. The user's current location may be identified by a symbol 212.

A user may conveniently print the map information, selected search results, directions, and/or coupons. A printer associated with a user's device (not shown) may print information including a coupon. The printed coupon may include coupon information that may be downloaded to a user's device. Coupon image may also be printed without downloading. The printed information may be conveniently taken with the user.

In connection with the coupon engine 120 and/or search system 102, the user may register using a user device (e.g. wireless device 105, CPU 106 or other device). In some embodiments the registration process may involve a download to the device through which the user registered of a coupon print manager (not shown). Coupon print managers in general are known. They may be used to control the printing of coupons by the client device to prevent or deter fraud. For example they may limit the number of times a coupon can be printed and/or it can render each coupon printed unique. For example, upon download of the coupon print manager, the system may also send a unique ID to be stored on the user's device. The coupon print manager may cause the unique ID information to be included on or with printed coupons. Unique ID information may include information to identify the user device used to register and/or other user related information. The unique ID information may be printed on coupons that are printed from the user device such that when fraud is detected the user device and/or user may be identified.

Alternatively, a user's mobile device may enable the user to view directions, maps, and real-time information associated with identified locations. The coupon information may also be routed from the search system 102 to a point of sale 110 where the user will be shopping. The coupon information may be held in a buffer pending purchase by the user of the matching product. Additionally, the coupon information may be displayed on a user's device. The user's device display may be used at the point of sale (e.g., checkout counter, cashier, etc.) to redeem the offer associated with the coupon information displayed on the user's device display. Other coupon redemption options are available as further detailed below.

Coupon Redemption

Using the map's (e.g., in FIG. 3), coupons pane 204, search results pane 203, and/or coupons tab, the user may view coupon information. From the coupon information a user may choose to make use of one or more coupons at a redemption location(s). One or more coupons may be printed using print manager and printer, sent to a user's mobile device, or sent directly to the point of sale 110 (or other location).

A user may then visit a location associated with the coupon such as a redemption facility, Retail/Point-of-Sale Facility 110 (see FIG. 1), event location, and/or other specified locations. The printed coupon may be used in a normal fashion by a user at the point of sale.

In one implementation, coupons may be associated with specific user(s) or user device(s), either directly via user identification information, or via information identifying the user's device. For example, the unique ID information, as discussed above, may be printed on the face of the coupon using encryption, encoding, and/or other techniques. The unique ID number may identify the user device using, for example, IP address, MAC address, geographical address, phone number, and or other device identifier. In addition user identification information may be printed on the coupon using encryption, encoding, and/or other techniques. One or more user IDs to be printed directly on the coupon. User ID may include social security number, name, address, and or other information used to identify a user or group of uses. User ID and user device ID may be incorporated into bar codes to be read by a bar code scanner at a retail point of sale location 110. In addition or alternatively, the coupon information may be sent to the user's mobile device and displayed on a screen for in-store redemption.

After consumer redemption, retailer 110 may communicate with a coupon issuer 112. In particular, information regarding the redemption amount and the redeeming location may be forwarded to coupon issuer 14, which may then credit retailer 110 with the total amount of discounts given.

In one implementation, user information (e.g., user ID, user device ID) may also be provided to coupon distributor 114, by a coupon information facility, retailer point of sale 110, and/or user 104, which may collate received user information and perform marketing analysis via a marketing analysis engine (not shown), implemented at the coupon distributor 114, to compile subsequent coupons. Coupon distributor 114 may utilize user-specific redemption data along with user-specific demographic data supplied by search system 102 in order to compile subsequent coupons for use by consumers once again. Coupon distributor 114 may provide coupon packages and facility location information to search system 102.

In the alternative, a coupon may be redeemed electronically by sending the coupon data in the output buffer via a data communications interface directly to a web site 150, 152 or online retailer 152. This is especially useful in the "electronic shopping mall" environment now found in many online services.

Coupon results may also be linked to inventory information. If an item that has an associated coupon or promotion is sold out at a particular store location, this information may be conveyed to search system 102. For example, a computer store (product provider) located on "E street" may be sold out of a laptop that is associated with a "$100-off" promotion. This information may be conveyed to search system 102 so that a user may not be informed of the "E street" location as a possible laptop coupon provider. Instead, other computer stores honoring the laptop promotion (and that have the promoted laptop in stock) may be conveyed to the user in the coupons results associated with search query and/or search results. Thus, the search system 102 may receive real-time coupon inventory information from product and service providers so that availability information may be conveyed to the user. As demonstrated in the example above, real-time inventory information may be linked to coupons database 140. Inventory may be updated based on in-store and/or online sales.

As coupons are redeemed, transactional data from retailers (e.g., retailer 110) may be associated with the coupon information and used to update the coupon information in the coupon database 140. According to analysis of the transactional data, coupons may be updated within coupon database 140 (or other location).

In another implementation, a user may engage in an on-line transaction, and then proceed to a physical retailer 110 to receive a product presented during the online transaction. The user may complete the transaction at retailer 110 by presenting identification indicia (e.g., name, membership identification number, invoice number, etc.) at the point-of-sale 110 terminal. The transaction may be recorded in a data processor as transaction data. Transaction data may include, for example, product type, user identification indicia, user demographic data, coupon identification data, transaction invoice, etc., without limitation. Optionally, other information may be solicited from the user at the point-of-sale terminal. For example, user demographic data or product survey data may be solicited, without limitation.

In one implementation, transaction information may be obtained from a point of sale terminal by coupon issuer 112. The transactional data may be analyzed in order to provide retailer 110 with appropriate redemption credit, and to also determine whether the coupons information stored at a coupon distributor 114 (or coupon issuer 112) is up to date based on redemption patterns, stock levels, availability, sales figures, and/or other information. If coupon information is not up to date to reflect this information, coupon information at coupon distributor 114 (or coupon issuer 112) is updated to discontinue certain coupons, and/or to provide new additional coupon information to search system 102.

Coupon Distribution

Coupon distributor 114, coupon issuer 112, product or service providers, or other coupon providers may maintain information regarding current and upcoming promotions and coupons in product service promotion database (not shown). Location of a facility associated with the coupon information may be conveyed to search system 102. Coupon information is sent and stored at the search system 102.

Coupons may be associated with various locations for different reasons. A coupon may be located on a map (e.g., similar to that displayed in FIG. 3) in association to a geographical location where a user may use a product. For example, a bike shop which sells and rents bikes may choose to associate (or display) coupon information on a bike trail depicted on the map. Coupon providers may choose multiple locations on a map to associate (or display) their coupon information. Thus, when a user conducts a search query for certain information limited to a certain location, the results may include coupon information associated with one or more locations on a displayed map where the user may redeem and/or make use of the coupon information. This may enable coupon providers to market their business in different ways.

According to other examples, coupon information may be displayed on a map in association with points of interest including public parks, beaches, mountains, trails, lakes, rivers, monuments, theaters, ball parks, stadiums, theme parks, halls, performance venues, airports, train stations, bus terminals and/or other locations.

In addition to coupon information being associated with map-defined locations, coupon information may also be associated with one or more search terms. The search term for a coupon may be based on the coupon text itself. Further yet, a coupon provider may choose additional search terms to be associated with the coupon. According to one example, a coupon for children's clothing may be automatically associated with at least the search terms "children" and "clothing," however, the coupon provider may choose to further associate the coupon with the search term "back to school" in order to receive more hits. This may enable coupon providers to market their coupons in various ways by creating keyword associations.

Time-based coupons may also be stored in coupon database 140. For example, information concerning yearly seasonal sales may be stored in an effort to alert regular (and or new) customers during sale time.

Alternatively, user interests may be stored in a user profile for automatic display of coupons. A user may store and update profile information saved in user-profile database 144 of search system 102. In creating and updating a user profile, a user may enter information including user demographics, interests, preferences and/or other information. As disclosed above, the user profile database may include categories of interest, details of user interests, location, frequency of visits to a particular facility, and/or other information.

In User Profile Database 144, user profile information may include categories of interest, details of user interests, frequency of visits to particular facilities, and other information. Categories of interest may include restaurants, groceries, products, services, clothing, pets, hobbies, sports, and other interests. Details may include the user's preferences and selections with respect to a particular category.

As an example, under the "pets" category, a user may provide details regarding the type of pets the user owns, how many pets the user currently owns, the type of pet food the user purchases, the preferred pet stores the user visits, and other related information. The user may also specify the frequency of visits to specified pet stores. In addition, the user may request services or products not available at the specified pet stores.

User profile information may additionally include data about previously purchased products, redeemed coupons, and/or other information conveyed from a retail facility based on user's past transactions. This information may be useful to coupon providers for targeting users with specific offers and specials for follow-up sales.

In user profile database 144, user location information may include the street address, city, county, state and zip code of the user's home address. Other identifying information may also be provided. The user may specify additional addresses, such as one or more work addresses, and other frequently visited locations including schools, day care facilities, and a relative's home. The user may prioritize the locations according to those most frequently visited, most conveniently located, or according to other criteria. User location information may also be conveyed to the search system 102 through a wireless device 105 with global positioning capability or a plug-in device on a CPU 106.

In user profile database 144, proximity preference information may include a designation of a range that a user is willing to travel to redeem coupons. For example, a user may specify a proximity range of a specified number of yards, blocks, miles, etc. the user is willing to travel to redeem coupons. The user may also specify an area, county, city, zip code, shopping center or other identifying markers. For example, a user may identify a proximity range of a five mile radius from the user's home address. In another example, the user may identify a proximity range as being the route traveled between the user's home address and work address. Also, the user may identify a proximity range as a shopping area, such as a local shopping mall, and/or shopping plazas within, for instance, a 3-mile radius. In another example, a user may select a reference point address, such as a well traveled intersection, as the point of reference in determining proximity ranges. According to another example, a mobile device may also specify proximity range, as detailed below.

In addition, coupon distributor 114, coupon issuer 112, product or service provider, or other coupon provider may specify proximity information, such as a target range of advertisement exposure. Location and proximity information specific to a particular entity, such as coupon distributor 114, may be stored. In this example, coupon distributor 114 may selectively target locations and areas within a defined range. Coupon distributor 114, or other service or product provider, may convey desired target proximity information to search system 102. This aspect of the invention enables a product or service provider to target coupons to potential consumers within a specified distance from one or more redemption facilities associated with the coupon. For example, a local florist may target coupons to consumers within a five mile radius of the florist's place of business. In another example, a national toy store may want to target consumers within specified cities in California and Nevada where sales might be lower than cities in New York or Maine.

Information related to the location of possible redemption facilities may be stored at the search system 102 in a database 140 or 142. Also, sales data and marketing strategies may be used to drive coupon exposure on a map.

Mobile Use

Figure 4:
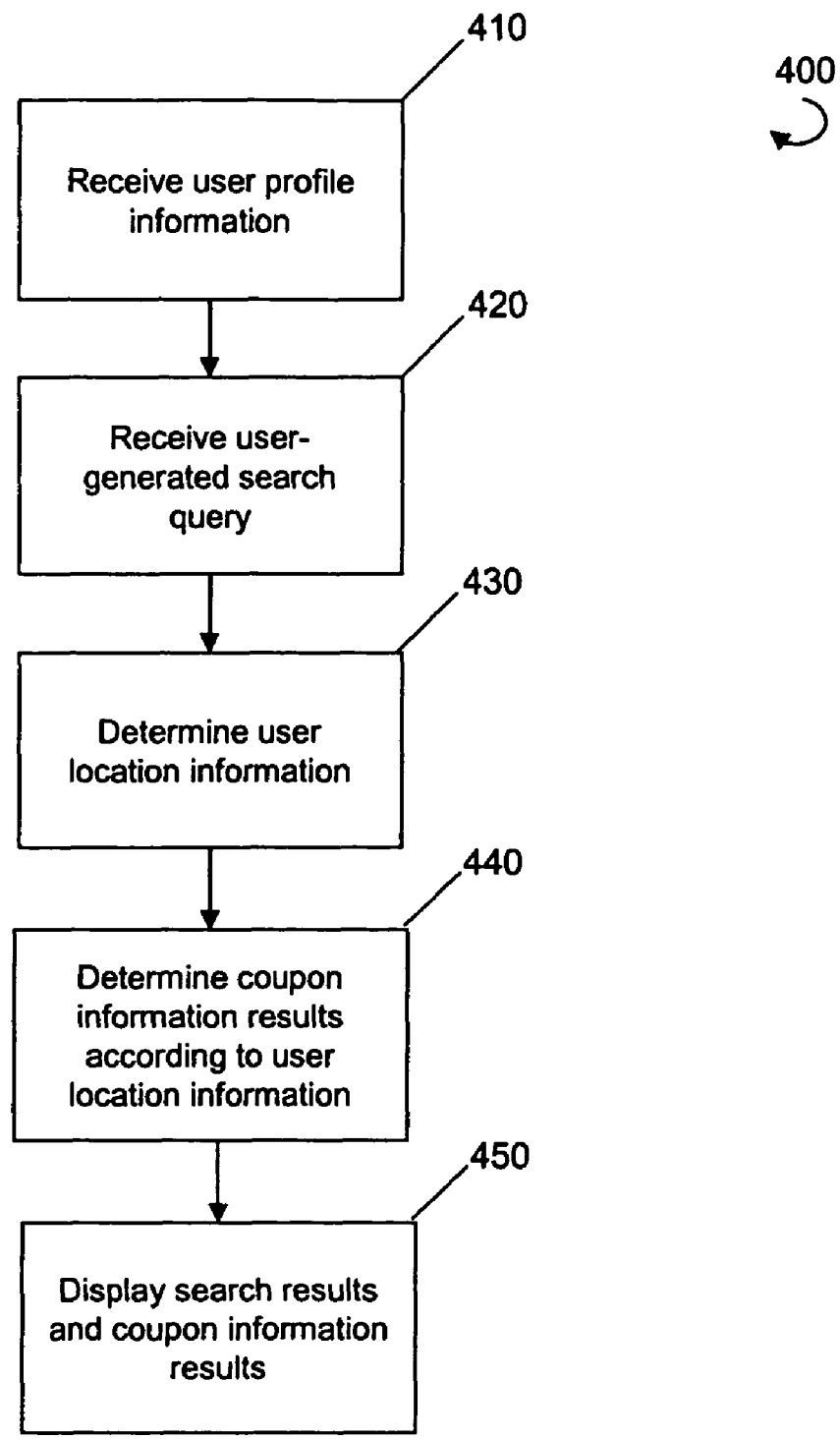
FIG. 4 depicts a flow chart of processing according to the invention, in one regard.

FIG. 4 is an exemplary illustration of a flowchart 400 of processing relating to electronic delivery of coupon information based on a mobile user's location.

In an operation 410, search system 102 (or other processing system) may receive user profile information from a user.

In an operation 420, a user may use their mobile device to enter a search query or create a search agent, for example, to find a business, service, product, and/or other information. The mobile user's location, identified via a GPS, may be conveyed to the search system 102 (operation 430). The user location information may be transmitted via a cell phone, a PDA, a pager or other device.

In an operation 440, search system 102 may generate search results and coupon information associated with the search query and/or search results according to the user location information. Results may be displayed to a mobile user in operation 450. User may be also be alerted using a specified notification mechanism of updates to existing search agents. This enables the user to take advantage of coupons at nearby locations while the user is within a close proximity to an associated point-of-sale facility.

In both mobile and non-mobile implementations, a user may also specify display preferences based on convenience considerations and other user preferences. The user may define a radius of display where possible locations within a user-defined mile radius may be displayed. For example, a user who resides in the city may opt for convenience and define a 3-mile radius of display from the user's home. In another example, if a user normally travels 10 miles to reach a shopping area, the user may specify a radius of 15 miles from the user's home or other designated location. Another option may enable a user to view the closest locations and coupons. For example, a user may prefer to view the closest three (or other predetermined number of) results associated with a coupon with respect to the user's work location. The user may also enter the user's daily commute from home to work and request a display of possible redemption facilities along this route or within a user-defined mile of this route. This enables the user to conveniently redeem coupons or take advantage of promotions along a frequently traveled route, such as a daily commute. According to another example, a user may specify a local region, such as a neighborhood, city, town, zip code, or other region. Other display preferences may also be defined.

With regard to a wireless device with global positioning capability, search system 102 may notify the user of proximate point-of-sale facilities where the user may redeem a coupon, take advantage of a coupon, or perform other transactions. According to this implementation, a user is notified of coupon information while the user is mobile (e.g., traveling from place to place, or away from a designated "home" location) and when the user is located within a proximate distance from a point-of-sale facility. Notification may be provided when the user is located nearby a redemption facility for ease in coupon redemption and other transactions.

Implementation Alternatives

Figure 5:
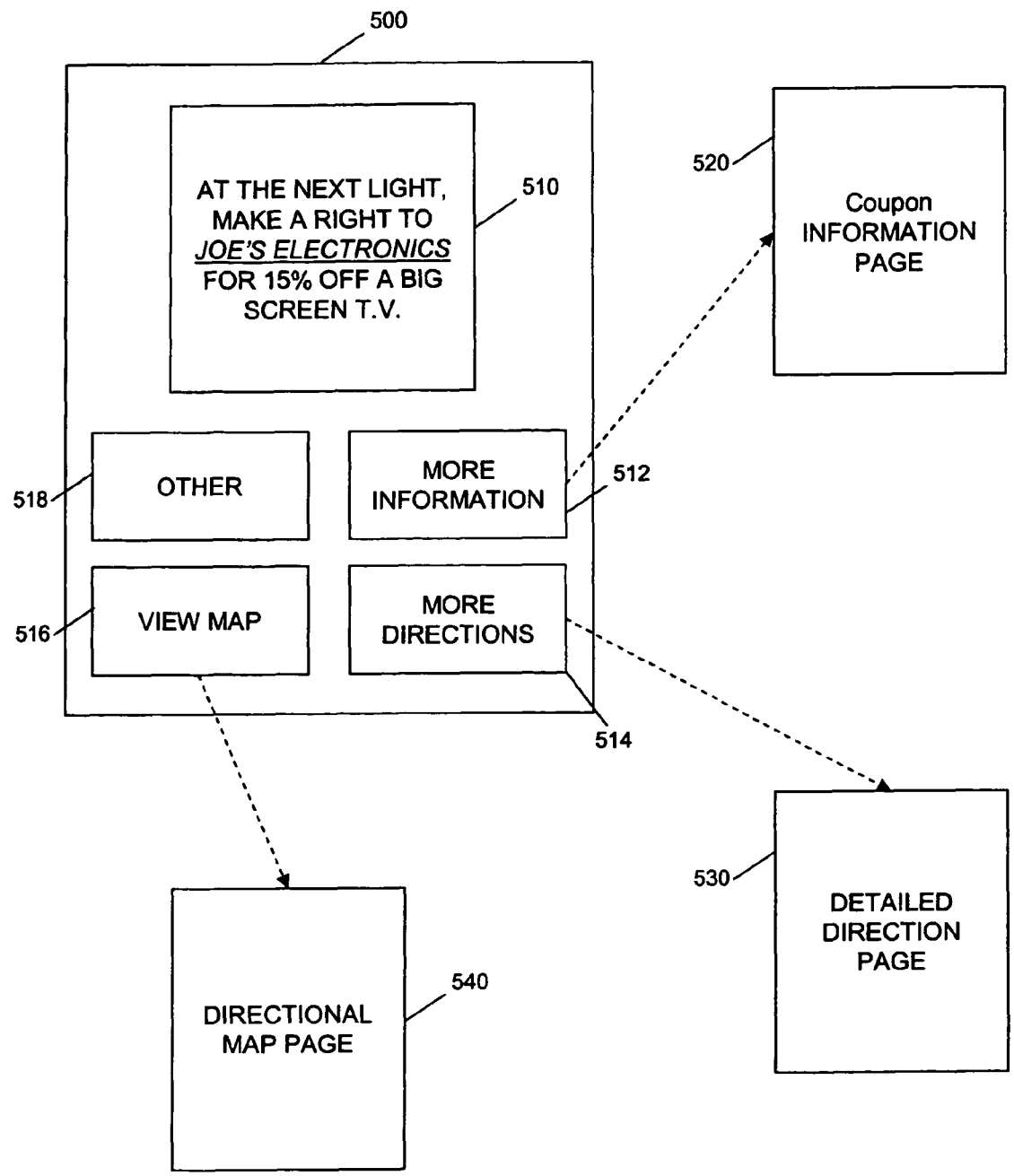
FIG. 5 is an exemplary depiction of coupon information displayed on a wireless device.

FIG. 5 is an exemplary illustration of a coupon information notification according to an aspect of the invention. Wireless Device 500 may display an coupon/promotion in Main Pane 510.

A user may select More Information 512 to view Coupon Information Page 520 which may display detailed information related to a coupon and the associated product or service.

A user may select More Directions 514 to view Detailed Direction Page 530 which may display street names and distances the user should travel to reach an identified facility.

A user may select View Map 516 to view Directional Map Page 540 which may display a local map plotting the user's location relative to an identified facility, such as a point-of-sale facility.

A user may also have the option to zoom in and out of the map view. Other functions may be available through Other 518. Alternatively, the map information may be presented within the same screen as the displayed coupon 510 for ease or convenience.

A user 104 may specify the category or type of coupons a user would like to be made aware of through a wireless device, or other device capable of providing global positioning information. For example, a mother of three young children may specify an interest in special offers for burgers or other meals her children enjoy. She may request to be informed of coupons for all burger establishments or she may select one or more chains, such as Burger One, House of Burgers, or Burger-Bonanza. While driving home from work, she may be notified that Burger One is having a special promotion on family dinners, such as a buy one, get one free offer from Burger One. With this notification, she may also receive directions to the nearest Burger One from her current location. For example, as she is driving home from work, she may be directed to exit at "Exit 25" and proceed 0.5 miles down the road. After completing her purchase, she may also view directions back to her original route. If a short cut is detected by search system 102, she may be notified of a more convenient alternative route.

A user may also request promotion or coupon notification regarding a particular product or type of product. For example, a user may request promotion notification of a digital camera. In another example, the user may request notification related to Nikon's Digital Camera Model Number CAMXX10058. While the user is traveling throughout the day, the user may receive promotion notification when situated within a predetermined distance from a facility that honors that promotion.

In another example, the invention provides the ability to travel to a different location and receive local promotion information. For example, a user from Virginia may travel to California with his or her family on vacation. The user may request promotions for seafood restaurants in the San Francisco area. In another example, the user may submit a request for promotions related to tourist attractions in a defined area, such as Los Angeles. During the vacation, the user may be notified that Disneyland is offering a free child admission with the purchase of 2 adult tickets.

According to another implementation, a user may also receive phone notification of customized promotions. For example, a user may receive a phone call from search system 102 where the user may listen to a description of a customized promotion and point-of-sale facility location.

Figure 6:
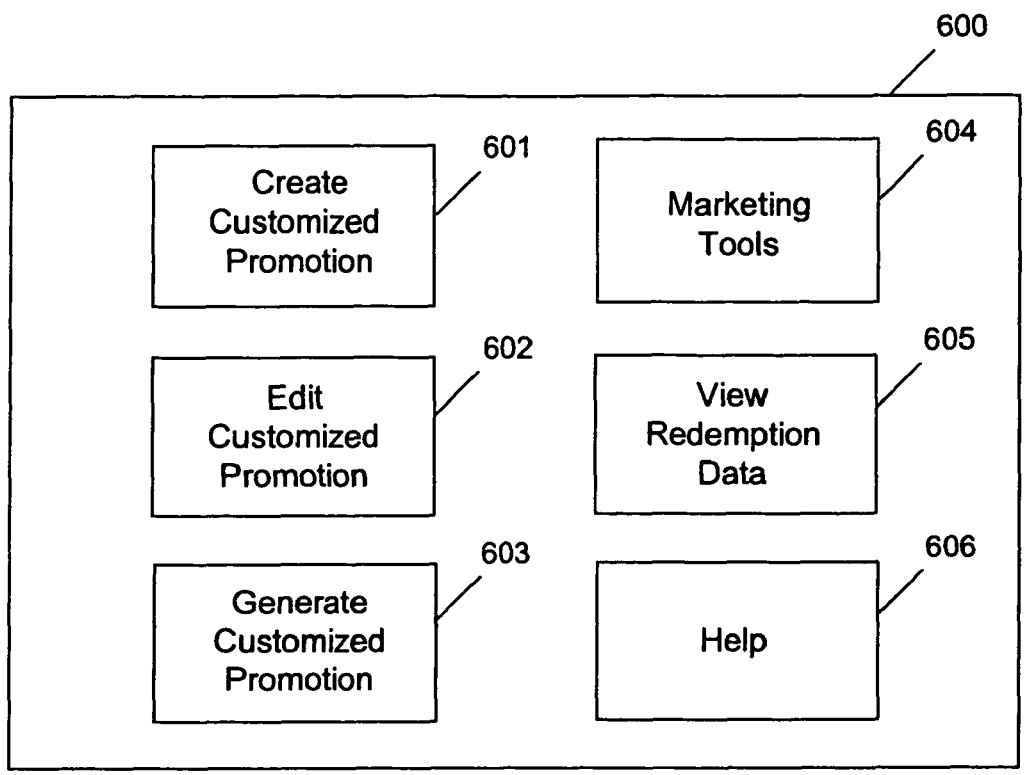
FIG. 6 is an exemplary depiction of a display that may be presented to a user.
Figure 7:
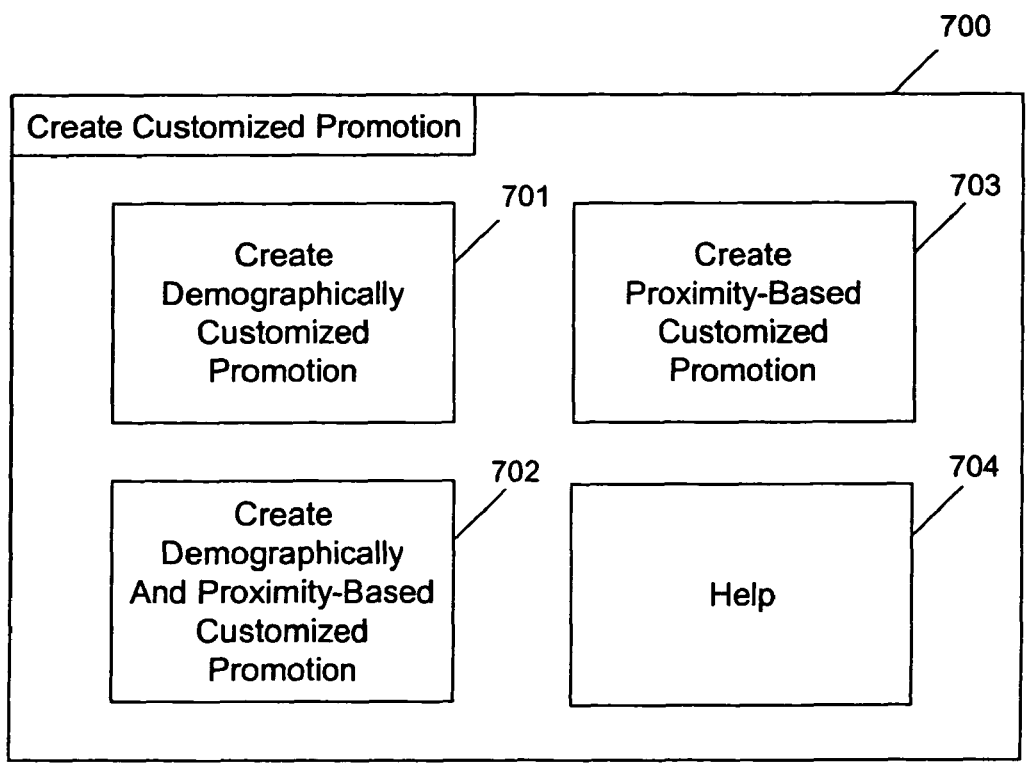
FIG. 7 is an exemplary depiction of a display that may be presented to a user.

FIGS. 6 and 7 are sample displays associated with the generation of a proximity-based customized promotion. As shown, a coupon issuer may, upon accessing search system 102 (or other application), be presented with a menu displaying various options, including an option to create a proximity-based customized product promotion. The coupon issuer, upon selecting this option, may be prompted to enter various data including product data, an offer description, a minimum and a maximum proximity range, and competitor parameter data, including a value representing a maximum radius around each remote user computer and a number of competitor-retail centers within each such maximum radius of each remote user computer, as described above.

Thus far, the invention has been described in connection with coupon information. It is to be understood that various aspects of the invention can be applied to electronic distribution of other incentives as well. Incentives may include advertisements, sales notifications, offers, offer codes, free samples, coupons, rebates and other product, service, or business related promotions.

Other embodiments, uses and advantages of the invention will be apparent to those skilled in the art from consideration of the specification and practice of the invention disclosed herein. Accordingly, the specification should be considered exemplary only.

The invention claimed is:

1. A computer-implemented method of generating a search response, comprising:
receiving a user search query comprising one or more search criteria, and a user device address for a user device, at a computer search system, said computer search system comprising a processor and memory, said memory storing available coupons information and stored store stock information, and said computer search system further comprising a search engine and a coupon engine;
said computer search system responding to said receiving by determining said search response; and
said computer search system transmitting to said user device address, said search response;
wherein said determining said search response comprises: said search engine using said one or more search criteria to generate search results; said coupon engine using said search results and user profile information associated with said user device address to identify from said available coupons information at least one available coupon offer, said at least one available coupon offer specifying a discount contingent upon a purchase transaction containing at least one specified product; and said computer search system determining, from said stored store stock information, a stocking store in which said at least one specified product is in stock; and
wherein said search response comprises said search results, said at least one available coupon offer, and identification of said stocking store.

2. The method of claim 1, wherein said search response contains format information for displaying said search results and said at least one available coupon offer in separate panes.

3. The method of claim 1, further comprising:
said computer search system transmitting to said user device address map data for viewing a map containing a location associated in said memory with said at least one available coupon offer.

4. The method of claim 1 further comprising:
storing in said memory available keyword-based advertisement information;
wherein said determining said search response further comprises said computer search system using said search results to identify from said available keyword-based advertisement information at least one available keyword-based advertisement; and
wherein said search response further comprises said at least one available keyword-based advertisement.

5. The method of claim 4, further comprising:
said computer search system transmitting to said user device address map data for viewing a map containing a location associated in said memory with said at least one available coupon offer.

6. The method of claim 4, wherein said search response contains formatting information for displaying each one of: said search results; said at least one available keyword-based advertisement; and said at least one available coupon offer in separate panes.

7. The method of claim 1, further comprising:
receiving at least one location search parameter;
wherein said determining said search response further comprises said search engine also using said at least one location search parameter to generate said search results.

8. The method of claim 7, wherein said search response further comprises formatting information for displaying each one of said search results and said at least one available coupon offer in separate panes.

9. The method of claim 7 further comprising:
said computer search system receiving said at least one location search parameter comprises retrieving location information stored in a user profile.

10. The method of claim 7, wherein said at least one location search parameter comprises at least one of a zip code, address, city, state, county, area code, district, point of interest, and coordinates.

11. The method of claim 7, wherein said at least one location search parameter is based on a GPS signal, IP address, and cookie information received in association with said user device address.

12. The method of claim 7, further comprising:
generating map data for displaying a map view comprising location identifiers associated in said memory with said at least one available coupon offer; and
said computer search system transmitting said map data to said address associated with said user device.

13. The method of claim 1 further comprising:
said memory storing store location information;
said computer search system identifying map data associated with said stocking store, and wherein said search response further comprises said map data.

14. The method of claim 13, wherein said search response contains formatting data for displaying said search results, said at least one available coupon offer and said map data in separate panes.

15. The method of claim 13 wherein said user profile information associated with said user device address comprises said location information.

16. The method of claim 13, wherein said location information comprises at least one of a zip code, address, city, state, county, area code, district, point of interest, or coordinates.

17. The method of claim 13 further comprising determining said location information from at least one of: a GPS signal, IP address, or cookie information received from the user device.

18. The method of claim 13, further comprising:
said computer search system generating direction information for travel from a location associated with said user device address and a specified location identifier.

19. The method of claim 1 further comprising
storing in said memory in association with said user device address a record of the observed online behavior;
wherein said determining said search response comprises said computer search system using at least said record of the observed online behavior in identifying said at least one available coupon offer.

20. The computer-implemented method of claim 1, wherein said transmitting further comprises sending a link to said user device address, wherein said link comprises a URL, and further comprising responding to receipt of a prompt from said user device address to said URL by transmitting to said user device address said at least one available coupon offer.

21. The computer-implemented method of claim 1, further comprising storing in said memory frequency of visits to a specified store in association with said user device address.

22. The computer-implemented method of claim 1, further comprising said computer search system updating said at least one available coupon offer; and
said computer search system transmitting notification of said updating to said user device address.

23. The computer-implemented method of claim 1, further comprising said computer search system storing in memory favorite search sites associated with said user device address;
and said computer search system transmitting an alert to said user device address when a coupon offer associated in said memory with a store identified in said memory and associated in said memory with said favorite searches, changes.

24. The computer-implemented method of claim 1, further comprising said computer search system routing said at least one available coupon offer to a POS.

25. The computer-implemented method of claim 1, further comprising said computer search system transmitting said at least one available coupon offer to an address associated with a web site.

26. The computer-implemented method of claim 1, further comprising associated in said memory said at least one available coupon offer with at least one keyword.

27. The computer-implemented method of claim 1, further comprising said computer search system varying terms of said at least one available coupon offer based on said stored store stock information.

28. The computer-implemented method of claim 1, further comprising said computer search system varying terms of said at least one available coupon offer transmitted to said user device address based on sales of associated products transmitted to said user device address.

29. The computer-implemented method of claim 1, wherein said user search query excludes a request or prompt for coupons.

30. The computer-implemented method of claim 7, wherein said at least one location search parameter comprises a response to a prompt transmitted to said user device address querying how far a user is willing to travel to redeem a coupon.

31. The computer-implemented method of claim 13, further comprising said computer search system transmitting to said user device address a proximity notification when in response to said computer search system determining that a device associated with said user device address is within a specified proximity of said stocking store.

32. The computer-implemented method of claim 1 further comprising repetitively generating and transmitting to said user device address map data upon receipt of location information indicating change in location of a device associated with said user device address.

33. A computerized system for generating a search response, comprising:
- a computer search system, said computer search system comprising a processor and memory, said memory storing available coupons information and stored store stock information, and said computer search system further comprising a search engine and a coupon engine;
- said computer search system is programmed to receive a user search query comprising one or more search criteria, and a user device address for a user device, generate a search response, and transmit said search response to said user device address;
- wherein said determining said search response comprises: said search engine using said one or more search criteria to generate search results; said coupon engine using said search results and user profile information associated with said user device address to identify from said available coupons information at least one available coupon offer, said at least one available coupon offer specifying a discount contingent upon a purchase transaction containing at least one specified product; and said computer search system determining, from said stored store stock information, a stocking store in which said at least one specified product is in stock; and
- wherein said search response comprises said search results, said at least one available coupon offer, and identification of said stocking store.

34. The system of claim 33 wherein said computer search system stores in said memory available keyword-based advertisement information;
- wherein said computer search system is programmed to use said search results to identify from said available keyword-based advertisement information at least one available keyword-based advertisement and to include at least one available keyword-based in said search response.

35. The system of claim 33 wherein said computer search system is further programmed to receive and use location information in determining said search response.

36. The system of claim 35 wherein said computer search system is programmed to use said location information in determining said stocking store.

* * * * *